United States Patent
Shimizu et al.

(10) Patent No.: US 10,508,738 B2
(45) Date of Patent: Dec. 17, 2019

(54) SIDE RAIL

(71) Applicant: KABUSHIKI KAISHA RIKEN, Chiyoda-ku, Tokyo (JP)

(72) Inventors: Hiroshi Shimizu, Tokyo (JP); Katsumi Murayama, Tokyo (JP)

(73) Assignee: KABUSHIKI KAISHA RIKEN, Chiyoda-ku, Tokyo (JP)

( * ) Notice: Subject to any disclaimer, the term of this patent is extended or adjusted under 35 U.S.C. 154(b) by 0 days.

(21) Appl. No.: 15/552,299

(22) PCT Filed: Feb. 17, 2016

(86) PCT No.: PCT/JP2016/000831
§ 371 (c)(1),
(2) Date: Aug. 21, 2017

(87) PCT Pub. No.: WO2016/136202
PCT Pub. Date: Sep. 1, 2016

(65) Prior Publication Data
US 2018/0038483 A1    Feb. 8, 2018

(30) Foreign Application Priority Data

Feb. 23, 2015 (JP) ................... 2015-033364

(51) Int. Cl.
*F16J 9/20* (2006.01)
*F16J 9/06* (2006.01)

(52) U.S. Cl.
CPC .. *F16J 9/20* (2013.01); *F16J 9/06* (2013.01)

(58) Field of Classification Search
CPC ........ F16J 9/06; F16J 9/068; F16J 9/12; F16J 9/066; F16J 9/067; F16J 9/145;
(Continued)

(56) References Cited

U.S. PATENT DOCUMENTS 2,614,899 A    10/1952    Phillips
2,656,228 A *  10/1953    Marien ................ F16J 9/063
                                                277/463
(Continued)

FOREIGN PATENT DOCUMENTS

CN    1708656 A    12/2005
CN    102939482 A    2/2013
(Continued)

OTHER PUBLICATIONS

Apr. 26, 2016, International Search Report issued in the International Patent Application No. PCT/JP2016/000831.
(Continued)

*Primary Examiner* — Eugene G Byrd
(74) *Attorney, Agent, or Firm* — Kenja IP Law PC

(57) ABSTRACT

A side rail (1) in a sprit ring shape is to be mounted on a space expander (2) and to constitute, together with the space expander (2), a multi-piece oil ring (3) used in an internal combustion engine. The side rail (1) includes an outer peripheral surface (14) facing radially outward, an inner peripheral surface (13) facing radially inward, a first axial surface (11) facing one end of an axial direction, and a second axial surface (12) facing the other end of the axial direction and parallel to the first axial surface (11). A bevelled portion (30) is provided between the outer peripheral surface (14) and the second axial surface (12) and formed in a tapered surface having a diameter gradually decreasing from a position on the outer peripheral surface (14) at 0.05 mm or more from the first axial surface (11) toward the second axial surface (12).

1 Claim, 5 Drawing Sheets

(58) Field of Classification Search
CPC ...... F16J 9/203; F16J 9/26; F16J 9/065; F16J 9/20; F16J 9/064; C23C 8/02; C23C 8/26; C25D 5/50; C25D 7/00; C25D 5/36; F02F 5/00
USPC .................................. 277/434, 469–481, 467
See application file for complete search history.

(56) References Cited

U.S. PATENT DOCUMENTS

| | | | | |
|---|---|---|---|---|
| 2,854,301 | A * | 9/1958 | Lutz | F16J 9/063 267/1.5 |
| 2,904,377 | A * | 9/1959 | Endres | F16J 9/068 267/1.5 |
| 3,695,622 | A * | 10/1972 | Davis | F16J 9/063 277/435 |
| 3,759,148 | A * | 9/1973 | Geffroy | F02F 3/00 277/451 |
| 4,111,437 | A * | 9/1978 | Saylor | F16J 9/066 277/435 |
| 4,115,959 | A * | 9/1978 | McCormick | C23C 4/10 51/295 |
| 4,194,747 | A * | 3/1980 | Nisper | F16J 9/069 267/1.5 |
| 4,429,885 | A * | 2/1984 | Chiba | F16J 9/068 267/1.5 |
| 4,542,907 | A * | 9/1985 | Chiba | F16J 9/067 267/1.5 |
| 4,548,416 | A * | 10/1985 | Maeda | F16J 9/069 267/1.5 |
| 4,759,266 | A * | 7/1988 | Murray | F16J 9/066 277/480 |
| 4,762,329 | A * | 8/1988 | Kooroki | F16J 9/066 267/1.5 |
| 5,129,661 | A * | 7/1992 | Ono | F16J 9/066 277/479 |
| 5,195,758 | A * | 3/1993 | Erway | F16J 9/066 267/1.5 |
| 5,469,616 | A * | 11/1995 | Miyazaki | F16J 9/066 29/888.07 |
| 5,718,437 | A * | 2/1998 | Tanaka | F16J 9/066 277/443 |
| 5,794,941 | A * | 8/1998 | Lahrman | F16J 9/063 277/441 |
| 6,834,861 | B2 * | 12/2004 | Takizawa | C22C 38/18 277/433 |
| 7,036,823 | B2 * | 5/2006 | Takiguchi | F16J 9/064 277/434 |
| 7,044,472 | B2 * | 5/2006 | Takahashi | F16J 9/067 277/434 |
| 7,854,191 | B2 * | 12/2010 | Kariya | F16J 9/068 92/160 |
| 8,835,549 | B2 * | 9/2014 | Gao | C09D 4/00 427/255.14 |
| 2002/0070507 | A1 * | 6/2002 | Heraud | F16J 9/062 277/434 |
| 2004/0061291 | A1 | 4/2004 | Takiguchi et al. | |
| 2004/0262847 | A1 * | 12/2004 | Inoue | C23C 8/02 277/443 |
| 2006/0027976 | A1 * | 2/2006 | Usui | F16J 9/062 277/434 |
| 2006/0061043 | A1 * | 3/2006 | Takahashi | F16J 9/068 277/434 |
| 2006/0113730 | A1 * | 6/2006 | Suzuki | F16J 9/062 277/434 |
| 2006/0169135 | A1 * | 8/2006 | Usui | F16J 9/068 92/248 |
| 2008/0122185 | A1 * | 5/2008 | Katou | F16J 9/062 277/434 |
| 2011/0221141 | A1 * | 9/2011 | Ayuzawa | F16J 9/068 277/434 |
| 2013/0049305 | A1 * | 2/2013 | Miyamoto | F16J 9/062 277/467 |
| 2013/0181410 | A1 * | 7/2013 | Chiba | F16J 9/062 277/443 |
| 2014/0021686 | A1 * | 1/2014 | Takahashi | F16J 9/066 277/442 |
| 2015/0240945 | A1 * | 8/2015 | Favaron | F16J 9/064 277/442 |

FOREIGN PATENT DOCUMENTS

| | | | | |
|---|---|---|---|---|
| CN | 105849444 | A | 8/2016 | |
| DE | 3833322 | A1 | 12/1989 | |
| EP | 2578908 | A1 | 4/2013 | |
| JP | S5763951 | U1 | 4/1982 | |
| JP | S6218467 | U1 | 2/1987 | |
| JP | H04111959 | U | 9/1992 | |
| JP | 2003049705 | A | 2/2003 | |
| JP | 2003074704 | A | 3/2003 | |
| JP | 2003194222 | A | 7/2003 | |
| JP | 2006300224 | A * | 11/2006 | ............... F16J 9/068 |
| JP | 2011075065 | A | 4/2011 | |
| JP | 2013130231 | A | 7/2013 | |
| WO | 2011040066 | A1 | 4/2011 | |

OTHER PUBLICATIONS

Aug. 29, 2017, International Preliminary Report on Patentability issued in the International Patent Application No. PCT/JP2016/000831.
Apr. 4, 2018, Office Action issued by the State Intellectual Property Office in the corresponding Chinese Patent Application No. 201680011454.6.
Jul. 24, 2018, Notification of Reasons for Refusal issued by the Japan Patent Office in the corresponding Japanese Patent Application No. 2015-0333642.
Oct. 5, 2018, the Extended European Search Report issued by the European Patent Office in the corresponding European Patent Application No. 16754954.2.
Feb. 5, 2019, Notification of Reasons for Refusal issued by the Japan Patent Office in the corresponding Japanese Patent Application No. 2015-033364.
Dec. 28, 2018, Office Action issued by the State Intellectual Property Office in the corresponding Chinese Patent Application No. 201680011454.6.
Jul. 23, 2019, Office Action issued by the China National Intellectual Property Administration in the corresponding Chinese Patent Application No. 201680011454.6.
Oct. 9, 2019, Communication pursuant to Article 94(3) EPC issued by the European Patent Office in the corresponding European Patent Application No. 16754954.2.

* cited by examiner

SIDE RAIL

TECHNICAL FIELD

This disclosure relates to a side rail to be mounted on a space expander in an annular shape and to constitute, together with the space expander, a multi-piece oil ring used in an internal combustion engine.

BACKGROUND

In addition to a compression ring for keeping combustion gas out, an oil ring for controlling oil on a cylinder inner surface is mounted on a piston of a reciprocating engine (an internal combustion engine). As such an oil ring, a multi-piece oil ring in which one or a pair of side rails are attached to a space expander in an annular shape has been popularly used.

The side rail used in the multi-piece oil ring is formed in a split ring shape with an opening such that, as being pushed by the space expander, the side rail extends its diameter and its outer peripheral surface contacts with the cylinder inner surface applying a predetermined contact pressure (a predetermined surface pressure). When the piston reciprocates during running of the engine, the outer peripheral surface of the side rail slides on the cylinder inner surface, forming an oil film with an appropriate thickness on the cylinder inner surface and scraping off excess oil adhered to the cylinder inner surface toward a crankcase to prevent the oil from climbing up to a combustion chamber.

In recent years, following an improvement in functionality of the internal combustion engine to meet a market demand for low fuel consumption and low oil consumption, there has been a demand for a multi-piece oil ring capable of reducing friction against the cylinder inner surface as well as the oil consumption by controlling an oil scraping-up action during piston upstroke (compression stroke and exhaust stroke) and amplifying an oil scraping-off action during piston downstroke (intake stroke and combustion stroke). In an effort to meet such a demand, there are proposed side rails having outer peripheral surfaces in various shapes facing radially outward.

For example, PLT 1 set forth below describes a side rail having an outer peripheral surface facing radially outward formed in a curved surface having a vertex at an axial center of the outer peripheral surface and protruding radially outward.

CITATION LIST

Patent Literature

PLT 1: JP-A-2003-194222

SUMMARY

Technical Problem

Generally, it is known that friction on the cylinder inner surface caused by the side rail may be reduced by reducing a contact width of the outer peripheral surface to contact with the cylinder inner surface. As such, in order to reduce the contact width, the side rails having outer peripheral surfaces in a vertically (in front and rear sides) asymmetrical shape with slight shape changes have been produced.

However, the outer peripheral surface formed in the vertically asymmetrical shape with slight shape changes as described above makes it difficult to discriminate between a top and a bottom (the front and rear sides) of the side rail. Therefore, there is a risk that the oil ring is assembled, or the oil ring is mounted on a ring groove of the piston, with the side rail facing in a wrong direction.

Therefore, it could be helpful to provide a side rail that facilitates discrimination between the top and the bottom thereof.

Solution to Problem

A side rail, in a sprit ring shape with an opening, to be mounted on a space expander in an annular shape and to constitute, together with the space expander, a multi-piece oil ring used in an internal combustion engine, the side rail including: an outer peripheral surface facing radially outward; an inner peripheral surface facing radially inward; a first axial surface facing one end of an axial direction; and a second axial surface facing the other end of the axial direction and parallel to the first axial surface, wherein a bevelled portion is provided between the outer peripheral surface and the second axial surface, and wherein the bevelled portion is formed in a tapered surface having a diameter gradually decreasing from a position on the outer peripheral surface at 0.05 mm or more from the first axial surface toward the second axial surface.

In the above configuration, the "split ring shape with an opening" refers to the side rail formed in a C-shape having a cutout. Also, the "axial direction" refers to a direction along an axis of the side rail in the split ring shape.

Preferably, in the above configuration the tapered surface includes: a main tapered surface; a first tapered surface subportion provided between the main tapered surface and the outer peripheral surface and inclined at an angle with respect to the axial direction smaller than an angle of the main tapered surface with respect to the axial direction; and a second tapered surface subportion provided between the main tapered surface and the second axial surface and inclined at an angle with respect to the axial direction larger than the angle of the main tapered surface with respect to the axial direction.

In the above configuration, preferably, the bevelled portion is formed in a tapered surface having a linearly decreasing diameter.

In the above configuration, preferably, the bevelled portion is formed in a tapered surface that concavely curves.

In the above configuration, preferably, the bevelled portion is formed in a tapered surface that convexly curves.

In the above configuration, preferably, the tapered surface includes a step-cut portion.

In the above configuration, preferably, the tapered surface includes a groove.

Advantageous Effect

According to the disclosure herein, the bevelled portion, which is made apparent, is provided between the outer peripheral surface and the second axial surface. Therefore, when a side rail has a directionality, i.e., fixed top and bottom (front and rear sides), a person may easily discriminate the top and the bottom of the side rail by viewing the bevelled portion with his/her eyes during production of the side rail or during assembly mounting the side rail on a ring groove of a piston.

According to the disclosure herein, as described above, a side rail that facilitates the discrimination between its top and bottom may be provided.

DETAILED DESCRIPTION

Hereinafter, the disclosure will be described in detail by using an embodiment with reference to the accompanying drawings.

Figure 1:
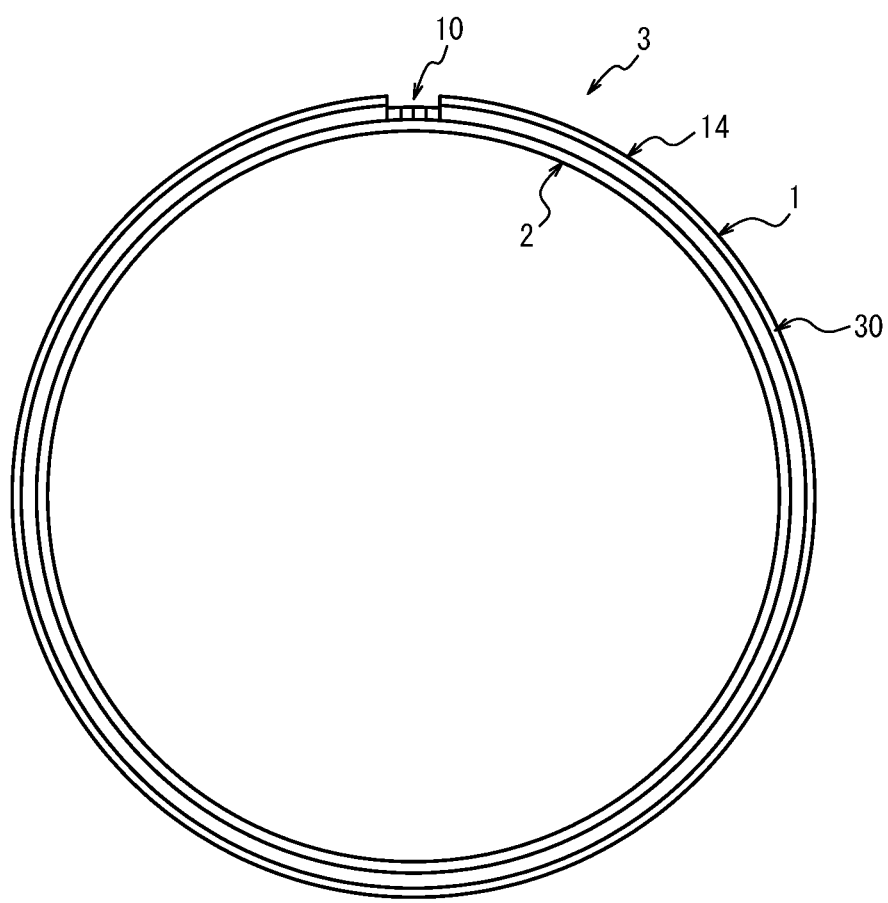
FIG. 1 is a plan view of a multi-piece oil ring that includes a side rail according to one embodiment.
Figure 2:
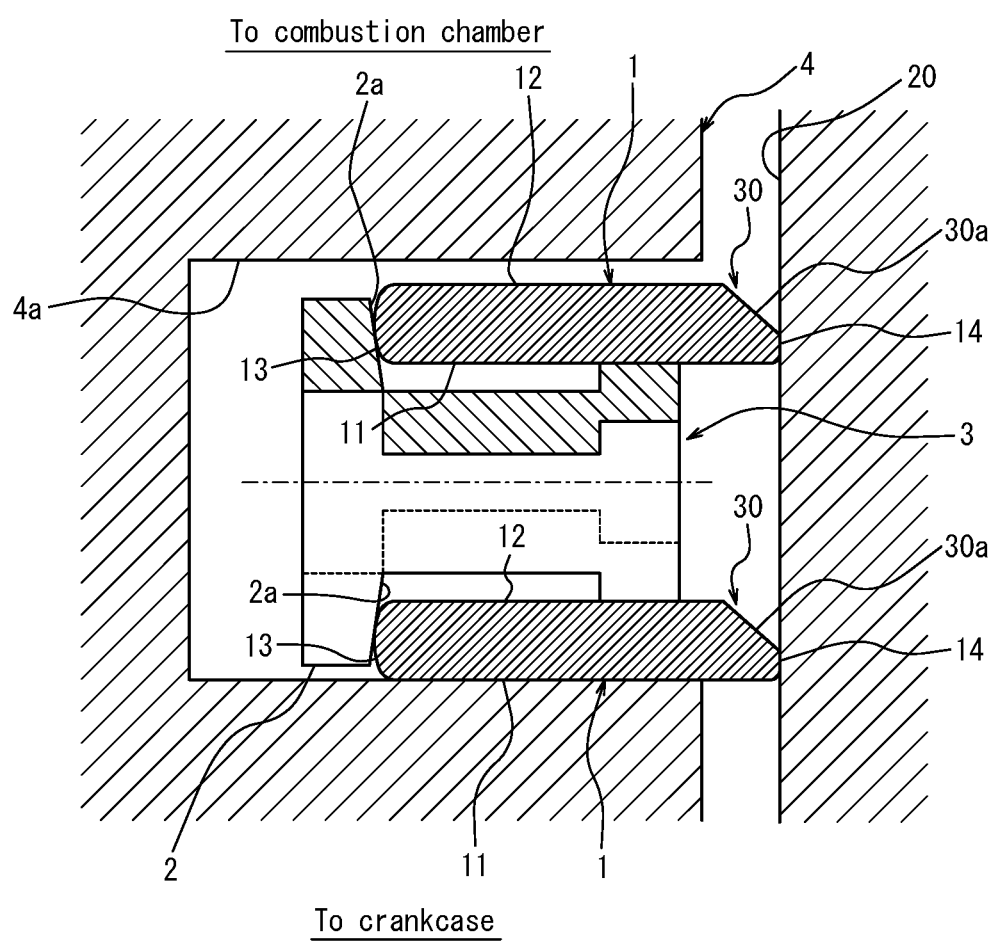
FIG. 2 is a longitudinal cross-sectional view of the multi-piece oil ring illustrated in FIG. 1 in use.

As illustrated in FIG. 1, a side rail 1 according to one embodiment, together with a space expander 2, constitutes a multi-piece oil ring (an oil-controlling ring) 3. In the figure, the multi-piece oil ring 3 is a three-piece oil ring made up of a pair of side rails 1 mounted on either axial side of the space expander 2. As illustrated in FIG. 2, the multi-piece oil ring 3 is placed in a ring groove 4a formed on a peripheral surface of a piston 4 in, for example, a reciprocating combustion engine that runs on petrol.

Alternatively, the multi-piece oil ring 3 may be a two-piece oil ring made up of one space expander 2 and one side rail 1.

The space expander 2 is made of steel and formed in an annular shape that may be elastically deformed radially inward and outward. The space expander 2, in a state being elastically deformed in a direction to reduce its diameter, is placed in the ring groove 4a of the piston 4 in such a manner as to push the side rail 1 radially outward and axially outward to expand the side rail 1.

Figure 3:
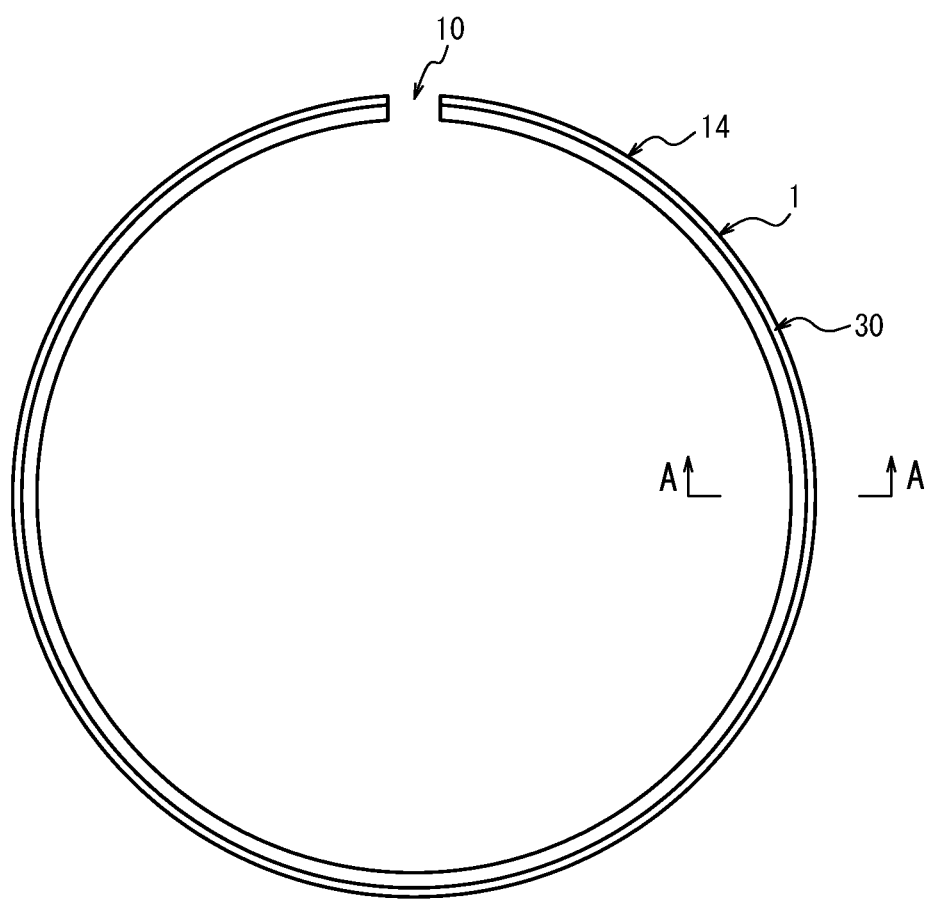
FIG. 3 is a plan view of the side rail illustrated in FIG. 1.

According to the present embodiment, the pair of side rails 1 have identical configurations and, as illustrated in FIG. 3, are each made with a planar steel belt curved to form a split ring shape with an opening 10. That is, the side rail 1 has a C-shape with the opening 10 formed as a cutout on a circumference of the side rail 1. The side rail 1 may be elastically deformed extending the opening 10 in a circumferential direction to extend a diameter of the side rail 1 itself radially outward.

Figure 4:
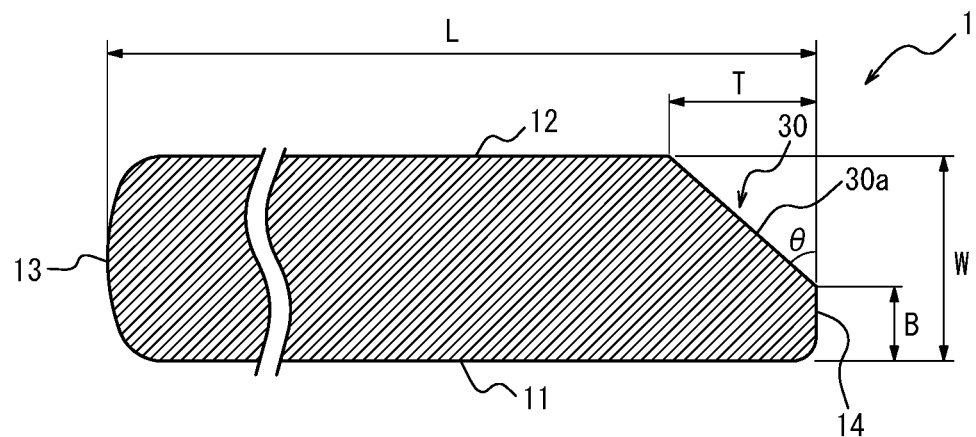
FIG. 4 is a cross-sectional view taken from line A-A of FIG. 3.

As illustrated in FIG. 4, the side rail 1 includes a first axial surface 11 facing one end of an axial direction (a downward direction in the figure), a second axial surface 12 facing the other end of the axial direction (an upward direction in the figure), an inner peripheral surface 13 facing radially inward, and an outer peripheral surface 14 facing radially outward. A cross-sectional shape of the side rail 1 perpendicular to its circumferential direction is approximately the same throughout the circumferential direction. Note that the "axial direction" refers to a direction along an axis of the side rail 1 having the split ring shape.

The first axial surface 11 is formed in a planar surface perpendicular to the axial direction. As illustrated in FIG. 2, the first axial surface 11 is facing a crankcase of the engine in a state where the multi-piece oil ring 3 including the side rail 1 is mounted on the piston 4.

As illustrated in FIG. 4, the second axial surface 12 is formed in a planar surface perpendicular to the axial direction, i.e., parallel to the first axial surface 11. As illustrated in FIG. 2, the second axial surface 12 is facing a combustion chamber of the engine in a state where the multi-piece oil ring 3 including the side rail 1 is mounted on the piston 4.

In the figure, an axial distance between the first axial surface 11 and the second axial surface 12 of the side rail 1, i.e., an axial thickness (a rail width) W of the side rail 1 is 0.35 mm. Also, a distance between the inner peripheral surface 13 and the outer peripheral surface 14, i.e., a radial length L of the side rail 1 is 1.52 mm.

As illustrated in FIG. 4, the inner peripheral surface 13 of the side rail 1 is formed in a curved surface (a barrel face) having a vertex at an axial center of the inner peripheral surface 13. As illustrated in FIG. 2, the inner peripheral surface 13 of the side rail 1 contacts with a mounting plane 2a of the space expander 2 in a state where the multi-piece oil ring 3 including the side rails 1 is mounted on the piston 4.

Note that the inner peripheral surface 13 is not limited to have the above shape but may have various shapes including a cylindrical surface parallel to the axial direction.

As illustrated in FIG. 4, the outer peripheral surface 14 of the side rail 1 is formed in a cylindrical surface parallel to the axial direction. As illustrated in FIG. 2, the outer peripheral surface 14 of the side rail 1 contacts with a cylinder inner surface 20.

The outer peripheral surface 14 of the side rail 1 includes one axial end having a bevelled portion 30 formed thereon. That is, the bevelled portion 30 is provided between the outer peripheral surface 14 and the second axial surface 12. A portion between the outer peripheral surface 14 and the first axial surface 11 does not need to be bevelled but may be formed in a curved surface such as an R shape. In this case, the R-shape has a radial width and an axial width that are smaller than those of the bevelled portion 30.

The bevelled portion 30 is formed by a tapered surface 30a with a diameter gradually decreasing from a position on the outer peripheral surface 14 where an axial distance B from the first axial surface 11 toward the second axial surface is at least 0.05 mm, i.e., a position on the outer peripheral surface 14 at 0.05 mm or more from the first axial surface 11 toward the second axial surface 12.

More preferably, the axial distance B indicative of a start point of the bevelled portion 30 is set to 0.10 mm or more.

In FIG. 4, the tapered surface 30a is formed in a linear tapered surface with a linearly reducing diameter (a conical surface shape). In this case, an angle θ of the tapered surface 30a with respect to the axial direction is preferably larger than 10 degrees, more preferably at least 30 degrees.

Also, a radial length T of the tapered surface 30a is preferably at least 0.05 mm.

According to the side rail 1 of the disclosure, as described above, the outer peripheral surface 14 includes one axial end having the bevelled portion 30 formed thereon in a visible manner. The bevelled portion 30 enables, when the side rail 1 has top-and-bottom directionality, workers to easily determine the top and bottom of the side rail 1 by viewing the bevelled portion 30 with his/her eyes during production of the side rail 1 or during assembly mounting the side rail 1 on the ring groove of the piston. Accordingly, during the production or the assembly, the side rail 1 is prevented from being mounted facing a wrong direction.

Figure 5:
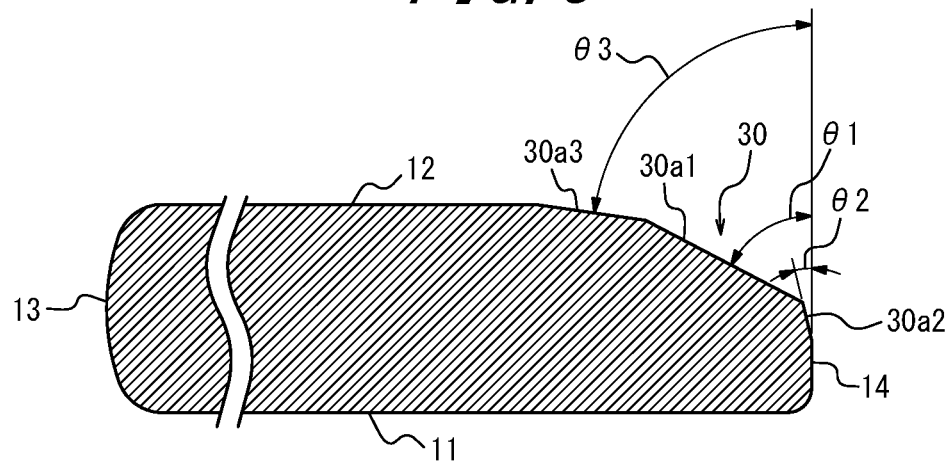
FIG. 5 is a cross-sectional view of a variation of the side rail illustrated in FIG. 4 having a bevelled portion made up of one main tapered surface and two tapered surface subportions.

The bevelled portion 30 may be formed by a combination of a plurality of tapered surfaces. As illustrated in FIG. 5, for example, the tapered surface forming the bevelled portion 30 may include a main tapered surface 31a-1 inclined at an angle θ1 with respect to the axial direction, a first tapered surface subportion 30a-2, and a second tapered surface subportion 30a-3. The first tapered surface subportion 30a-2 is provided between the main tapered surface 31a-1 and the outer peripheral surface 14 and inclined at an angle θ2, smaller than the angle θ1, with respect to the axial direction. The second tapered surface subportion 30a-3 is provided between the main tapered surface 31a-1 and the second axial surface 12 and inclined at an angle θ3, larger than the angle θ1, with respect to the axial direction.

When the bevelled portion 30 is formed by a combination of a plurality of tapered surfaces as described above, a radial length T of the bevelled portion 30 is secured in such a manner that the bevelled portion 30 becomes apparent and, simultaneously, the first and second tapered surface subportions 30a-2 and 30a-3 may be gently joined to the outer peripheral surface 14 and the second axial surface 12, respectively. This configuration enables the bevelled portion 30 to prevent scraping-up of oil on the cylinder inner surface 20, which would be otherwise caused by an edge of the outer peripheral surface 14, and reduces oil consumption. Further, this configuration enables the bevelled portion 30 to actively introduce the oil between the second axial surface 12 and an inner surface of the ring groove 4a, reducing friction between the side rail 1 and the inner surface of the ring groove 4a.

Figure 6:
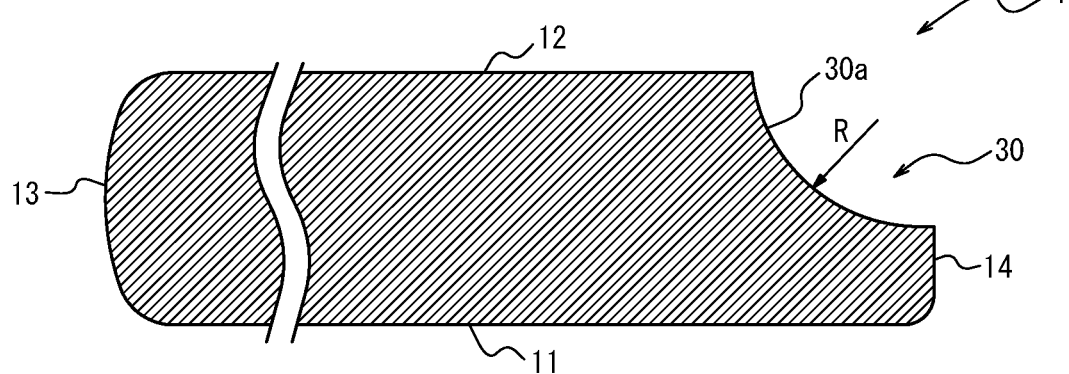
FIG. 6 is a cross-sectional view of a variation of the side rail illustrated in FIG. 4 having a bevelled portion formed in a tapered surface that concavely curves.

As illustrated in FIG. 6, the tapered surface 30a of the bevelled portion 30 may be concavely curved. In this case, the tapered surface 30a preferably has a constant radius of curvature. However, the tapered surface 30a may have the radius of curvature that gradually changes.

Figure 7:
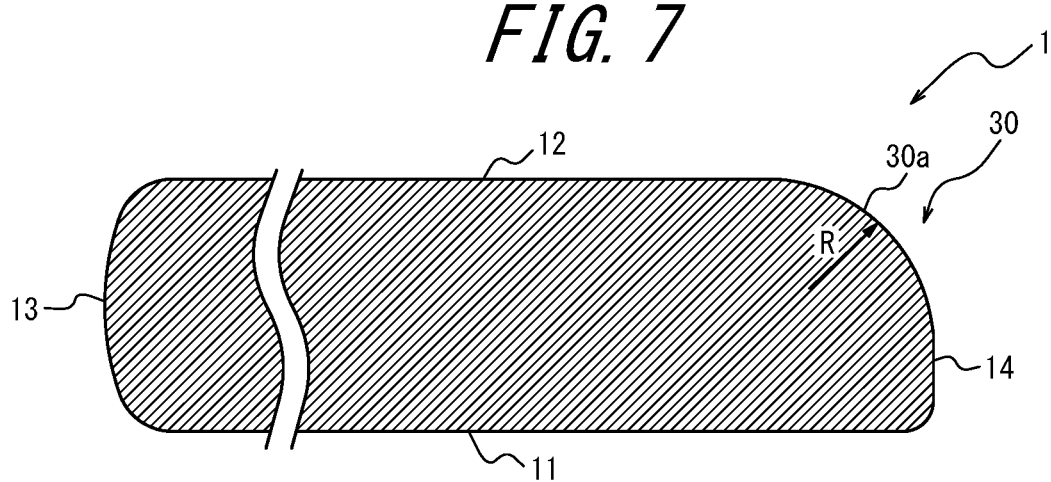
FIG. 7 is a cross-sectional view of a variation of the side rail illustrated in FIG. 4 having a bevelled portion formed in a tapered surface that convexly curves.

As illustrated in FIG. 7, also, the tapered surface 30a of the bevelled portion 30 may be convexly curved. In this case, the tapered surface 30a preferably has a constant radius of curvature. However, the tapered surface 30a may have the radius of curvature that gradually changes.

When the bevelled portion 30 is formed by the tapered surface 30a concavely or convexly curved as described above, the bevelled portion 30 becomes more apparent, further facilitating the discrimination between the top and the bottom of the side rail 1.

Figure 8:
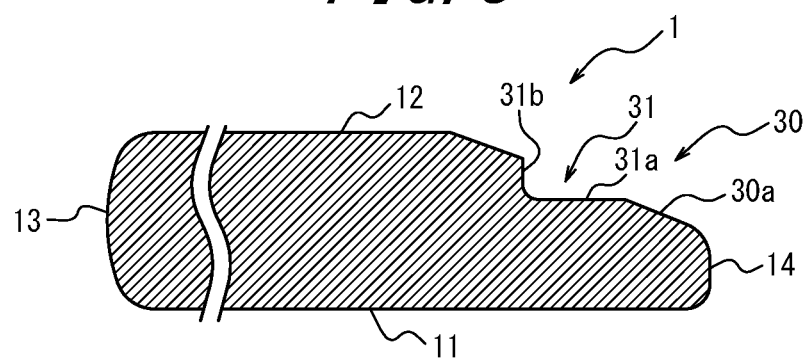
FIG. 8 is a cross-sectional view of a variation of the side rail illustrated in FIG. 4 having a tapered surface that includes a step-cut portion.

As illustrated in FIG. 8, also, the bevelled portion 30 may be formed by the tapered surface 30a having a step-cut portion 31. The step-cut portion 31 includes a horizontal surface 31a perpendicular to the axial direction and a vertical surface 31b parallel to the axial direction, and is provided at an approximate center of the tapered surface 30a.

The step-cut portion 31 provided to the tapered surface 30a as described above makes the bevelled portion surface 30b more apparent, further facilitating the discrimination between the top and the bottom of the side rail 1.

Figure 9:
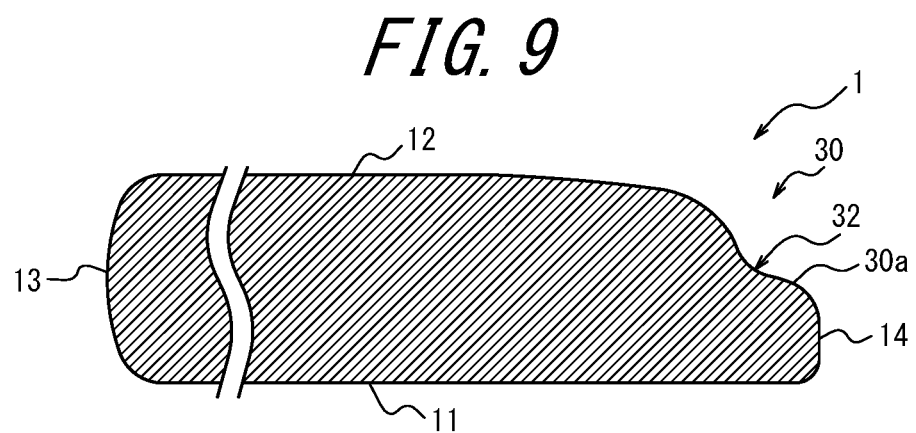
FIG. 9 is a cross-sectional view of a variation of the side rail illustrated in FIG. 4 having a tapered surface that includes a groove.

As illustrated in FIG. 9, further, the bevelled portion 30 may be formed by the tapered surface 30a having a groove 32, instead of the step-cut portion 31.

In this case, the tapered surface 30a is formed in a smooth convex curve, and the groove 32 is formed in a smooth concave curve and provided at the approximate center of the tapered surface 30a. The tapered surface 30a and the groove 32 are joined to each other forming a smooth curved surface. Also, the tapered surface 30a and the outer peripheral surface 14, and the tapered surface 30a and the second axial surface 12, are smoothly joined to one another.

The groove 32 as described above provided on the tapered surface 30a also makes the bevelled portion 30 more apparent, further facilitating the discrimination between the top and the bottom of the side rail 1. Further, when the tapered surface 30a that forms the bevelled portion 30 is formed in a smooth surface that is convexly curving, the radial height T of the bevelled portion 30 is secured, making the bevelled portion 30 more apparent. Also, the tapered surface 30a may be gently joined to the outer peripheral surface 14 and the second axial surface 12. This configuration enables the bevelled portion 30 to prevent the oil on the cylinder inner surface 20 from being scraped up during the piston upstroke, which would be otherwise caused by the edge of the outer peripheral surface 14, and thus reduces the oil consumption. Further, this configuration enables the bevelled portion 30 to actively introduce the oil between the second axial surface 12 and the inner surface of the ring groove 4a to reduce the friction against the inner surface of the ring groove 4a caused by the side rail 1.

Although not illustrated in the figure, a hard film (a hard layer) may be provided at least on the outer peripheral surface 14 and the bevelled portion 30, i.e., the tapered surface 30a. The hard film may contain at least one layer selected from the group consisting of, for example, a nitrided layer, a PVD-processed layer, a hard-chromium plated layer, and a DLC layer.

Note that the "PVD treated layer" refers to "a layer formed by physical vapor deposition (Physical Vapor Deposition)", and the "DLC (Diamond Like Carbon) layer" refers to a noncrystalline hard carbon film mainly composed of hydrocarbon or carbon allotrope.

The hard film provided on the tapered surface 30a as described above offers effects of preventing the outer peripheral surface 14 from changing its shape due to abrasion, reducing a decrease of a surface pressure, maintaining oil controlling functionality, and reducing the oil consumption and fuel consumption of the engine for a long period of time. Also, the hard film may provide the bevelled portion 30, which is to be viewed by workers, with a hue that is clearly different from a hue of the second axial surface 12 and the outer peripheral surface 14. Or, when the outer peripheral surface 14 is subjected to lapping, a difference between the hue of the outer peripheral surface 14 and a hue of the remaining portion becomes more apparent. Therefore, such a hard film as described above may make the bevelled portion 30 more apparent, further facilitating the discrimination between the top and the bottom of the side rail 1.

EXAMPLE

One hundred side rails in the shape as illustrated in FIG. 4 were prepared. These side rails each had the axial thickness (W) of 0.35 mm, the axial distance (B) of 0.15 mm, and the angle (θ) of 30 degrees. The axial distance (B) indicates a start position of the bevelled portion on the outer peripheral surface, and the angle (θ) is an angle of the tapered surface of the bevelled portion with respect to the axial direction. Then, ten workers determined the top and the bottom of the side rails by viewing the side rails with their eyes. As a result, the tops and the bottoms of all of the side rails were correctly discriminated from each other by the workers.

It is to be understood that the disclosure herein is not limited to the foregoing embodiment but may be varied in a variety of manners without departing from the spirit and the scope of the disclosure herein.

For example, although in the foregoing embodiment the outer peripheral surface 14 is formed in a cylindrical surface parallel to the axial direction, the outer peripheral surface 14 may have a different shape including a vertically (in front and rear sides) asymmetrical shape with a slight shape change.

REFERENCE SIGNS LIST 1 side rail
2 space expander
2a mounting plane
3 multi-piece oil ring
4 piston
4a ring groove
10 opening
11 first axial surface
12 second axial surface
13 inner peripheral surface
14 outer peripheral surface
20 cylinder inner surface
30 bevelled portion
30a tapered surface
30a-1 main tapered surface
30a-2 first tapered surface subportion
30a-3 second tapered surface subportion
31 step-cut portion
31a horizontal surface
31b vertical surface
32 groove
W axial thickness
L radial length
B axial distance
θ angle
T radial length
θ1 angle
θ2 angle
θ3 angle

The invention claimed is:

1. A side rail, in a sprit ring shape with an opening, to be mounted on a space expander in an annular shape and to constitute, together with the space expander, a multi-piece oil ring used in an internal combustion engine, the side rail comprising:
    an outer peripheral surface facing radially outward;
    an inner peripheral surface facing radially inward;
    a first axial surface facing one end of an axial direction; and
    a second axial surface facing the other end of the axial direction and parallel to the first axial surface,
    wherein the side rail has a planar shape,
    wherein a bevelled portion is provided between the outer peripheral surface and the second axial surface, and
    wherein the bevelled portion is formed in a tapered surface having a diameter gradually decreasing from a position on the outer peripheral surface at 0.05 mm or more from the first axial surface toward the second axial surface,
    wherein the tapered surface comprising:
        a main tapered surface;
        a first tapered surface subportion provided between the main tapered surface and the outer peripheral surface and inclined at an angle with respect to the axial direction smaller than an angle of the main tapered surface with respect to the axial direction; and
        a second tapered surface subportion provided between the main tapered surface and the second axial surface and inclined at an angle with respect to the axial direction larger than the angle of the main tapered surface with respect to the axial direction,
    wherein the main tapered surface is provided between the first tapered surface subportion and the second tapered surface subportion.

* * * * *